US00RE39214E

(19) United States
(12) Reissued Patent
Gryskiewicz

(10) Patent Number: US RE39,214 E
(45) Date of Reissued Patent: Aug. 1, 2006

(54) BLENDING TEXT AND GRAPHICS FOR DISPLAY

(75) Inventor: Paul S. Gryskiewicz, Chandler, AZ (US)

(73) Assignee: Intel Corporation, Santa Clara, CA (US)

(21) Appl. No.: 10/742,694

(22) Filed: Dec. 19, 2003

Related U.S. Patent Documents

Reissue of:

(64) Patent No.: 6,545,724
Issued: Apr. 8, 2003
Appl. No.: 09/430,328
Filed: Oct. 29, 1999

(51) Int. Cl.

| | |
|---|---|
| ***H04N 9/74*** | (2006.01) |
| ***H04N 9/66*** | (2006.01) |
| ***G09G 5/02*** | (2006.01) |
| ***G09G 5/00*** | (2006.01) |
| ***G09G 9/00*** | (2006.01) |
| ***G09G 9/40*** | (2006.01) |

(52) U.S. Cl. ..... 348/597; 348/598; 348/578; 348/587; 348/641; 348/589; 382/162; 382/165; 382/261; 382/266

(58) Field of Classification Search ..... 348/597, 348/598, 578, 587, 589, 641
See application file for complete search history.

(56) References Cited

U.S. PATENT DOCUMENTS

| | | | | | |
|---|---|---|---|---|---|
| 4,580,158 | A | * | 4/1986 | Macheboeuf | 348/587 |
| 4,763,120 | A | * | 8/1988 | Morrish et al. | 345/694 |
| 4,827,253 | A | * | 5/1989 | Maltz | 345/640 |
| 4,827,344 | A | * | 5/1989 | Astle et al. | 348/597 |
| 5,134,667 | A | * | 7/1992 | Suzuki | 382/164 |
| 5,442,462 | A | * | 8/1995 | Guissin | 358/463 |
| 5,644,333 | A | * | 7/1997 | King et al. | 345/641 |
| 5,663,772 | A | * | 9/1997 | Uehara et al. | 348/671 |
| 5,696,527 | A | * | 12/1997 | King et al. | 345/634 |
| 5,894,330 | A | * | 4/1999 | Huang et al. | 348/447 |
| 5,953,076 | A | * | 9/1999 | Astle et al. | 348/584 |
| 5,963,262 | A | * | 10/1999 | Ke et al. | 348/447 |
| 6,023,302 | A | * | 2/2000 | MacInnis et al. | 348/597 |
| 6,055,340 | A | * | 4/2000 | Nagao | 382/261 |
| 6,094,226 | A | * | 7/2000 | Ke et al. | 348/446 |
| 6,115,498 | A | * | 9/2000 | Ro et al. | 382/200 |
| 6,229,550 | B1 | * | 5/2001 | Gloudemans et al. | 345/641 |
| 6,266,100 | B1 | * | 7/2001 | Gloudemans et al. | 348/587 |
| 6,373,992 | B1 | * | 4/2002 | Nagao | 382/266 |
| 6,377,269 | B1 | * | 4/2002 | Kay et al. | 345/589 |

OTHER PUBLICATIONS

Patent Abstracts of Japan, vol. 1999, No. 03, Mar. 31, 1999 & JP 10 327364 □□A (LG Electron Inc), Dec. 8, 1998, (1 PG).*

Patent Abstracts of Japan vol. 016, No. 271 (E–1218), Jun. 18, 1992 & JP 04 □□063073 A Matsushita Electric Ind Co Ltd), Feb. 28, 1992, (1 PG).*

Patent Abstracts of Japan vol. 1995, No. 09, Oct. 31, 1995 & JP 07 162816 □□(Matsushita Electric Ind Co Ltd), Jun. 23, 1995, (1 PG).*

Patent Abstracts of Japan, vol. 015, No. 342 (P–1244), Aug. 28, 1991, & JP □□03 126993 A (Dainippon Printing Co Ltd), May 30, 1991, (1 PG).*

Patent Abstracts of Japan, vol. 1995 No. 03, Apr. 28, 1995 & JP 06 337662 A (Matsushita Electric Ind Co Ltd), Dec. 6, 1994, (1 PG).*

* cited by examiner

*Primary Examiner*—Paulos M. Natnael
(74) *Attorney, Agent, or Firm*—Jeffrey B. Huter

(57) ABSTRACT

Text and graphics elements may be alpha blended in a way to reduce flicker when the text or graphics are display by a processor-based television receiver. The alpha values are used to intelligently smooth pixels adjacent the element to create television text and graphics.

36 Claims, 4 Drawing Sheets

BLENDING TEXT AND GRAPHICS FOR DISPLAY

Matter enclosed in heavy brackets [ ] appears in the original patent but forms no part of this reissue specification; matter printed in italics indicates the additions made by reissue.

BACKGROUND

The present invention relates generally to techniques for displaying computer information on televisions.

In a number of applications, users may wish to display computer information on a conventional television receiver. Using a television receiver (which the user may already have) instead of a computer monitor may result in cost savings. In addition, some users may wish to have a computer system which doubles as a television receiver. Thus, the user may watch conventional television programs using a tuner card in the computer system to tune to the desired programs. In devices known as set top computers, a computer system may be mounted atop a conventional television to implement combined television receiving and conventional computer functions. For example, such systems advantageously implement electronic programming guides for computer control of television program access.

Interlacing contributes to the inferior quality of images developed by computer systems that are displayed on television monitors. Interlacing is a technique by which a complete television picture is developed in two passes from top to bottom on the television screen. With interlacing, the first pass paints all the "odd" lines and the second pass paints the "even" lines.

Flicker may occur when the images in the odd lines are very different from the images in the even lines. As the odd and even lines are alternately displayed, the eye may perceive the quick appearing and disappearing of visual information. Flicker is especially noticeable when viewing thin horizontal lines that only take up a single odd or even row. The same objectionable phenomenon occurs at the horizontal boundaries of text.

A flicker filter may be used to reduce such flickering. A flicker filter is generally a 3 or 5 tap finite impulse response (FIR) filter. An N-tap filter uses N multiplications and N-1 additions per color component of each output pixel. An equation representing the calculation implemented by a 3-tap filter is as follows:

$$Pout=T1*P1+T2*P2+T3*P3$$

T1, T2 and T3 are the tap values and P1, P2 and P3 are the values of adjacent pixels. Thus, flicker filters are quite computationally intensive.

Some flicker filters work by altering the information in the odd and even lines of a television picture so that the alternating lines are more similar to each other. In this way, when the lines appear and disappear in the interlacing process, the flicker is less noticeable. The more similar the lines are made to appear, the less flicker is visible. Other flicker filters reduce flicker by completely discarding every other line of the image, and displaying two successive passes of the remaining lines. Because the interlaced lines are now identical, flicker is less visible. In either case, vertical resolution is sacrificed. The obvious trade-off is that as flicker is reduced, more and more information is altered or lost from the original picture. Thin, horizontal lines may disappear. Small text may become unreadable.

The quality of flicker filters may vary based on design and cost. Low end flicker filters apply their techniques to the entire screen indiscriminately or blindly. These types of flicker filters may cause undesirable results, when only a small portion of the screen needs filtering, by adversely altering regions that were unnecessarily filtered.

Thus, there is a continuing need for ways to economically improve the display of information from processor-based systems on televisions.

SUMMARY

In accordance with one aspect, a method includes acquiring a graphics primitive to be displayed on a television receiver. The transparency of portions of the primitive are selectively adjusted relative to a background to reduce flicker when the primitive is displayed on a television receiver.

Other aspects are set forth in the accompanying detailed description and claims.

DETAILED DESCRIPTION

Figure 1:
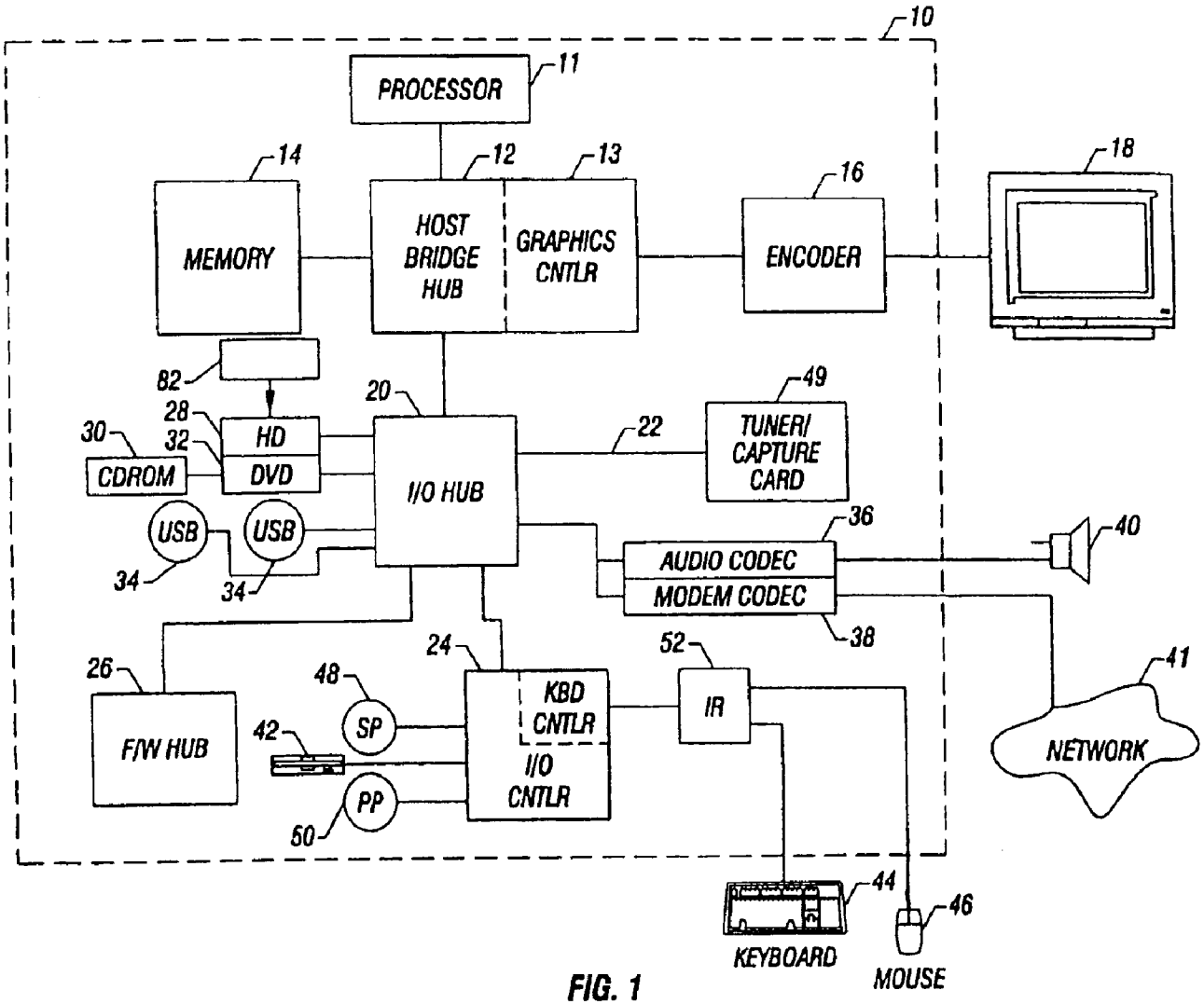
FIG. 1 is a block diagram of a computer system according to a preferred embodiment.

Referring to FIG. 1, a processor-based system 10 may use a television receiver 18 to display information. Although the system 10 is illustrated as a personal computer, the present invention may also be implemented on other computer platforms or architectures, such as set-top boxes, processor-based appliances, video game players, and digital video disk ("DVD") players.

A processor 11 is coupled to a host bridge hub 12, such as an Intel® 82810 graphics and memory controller hub, in one embodiment of the invention. The host bridge hub 12 may include a memory controller for accessing a main memory 14 (e.g. synchronous dynamic random access memory ("SDRAM")), and graphics controller 13 with motion compensation video capabilities. The graphics controller 13 may also include a digital video output port which couples (via an external video encoder 16) to the analog television receiver 18.

As will be explained below, font and graphics libraries may be used in one embodiment of the invention for rendering fonts and lines in a manner that flicker is reduced. In some embodiments flicker may be reduced with less processing than conventional flicker filters.

The host bridge hub 12 may also couple an input/output ("I/O") controller hub 20, such as an Intel® 82801 I/O hub in one embodiment of the invention. The I/O controller hub 20 may be an integrated multifunctional I/O controller hub that provides the interface to a bus 22, a multifunction I/O controller 24, and a firmware hub 26 and may integrate other functions, such as an enhanced direct memory access ("DMA") controller, an interrupt controller, a timer, an integrated drive electronics ("IDE") controller for providing IDE ports, and a universal serial bus ("USB") host controller, as examples. Four IDE devices, such as a hard disk drive 28, a compact disk read only memory ("CD- ROM") drive 30, and a DVD drive 32 may be coupled to the hub 20. A television tuner/capture card 49 may also be coupled to the hub 20.

The I/O controller hub 20 may support two codecs such as the audio codec 36 and modem codec 38. The audio codec 36 may be coupled to a speaker 40 and the modem codec 38 may be coupled to a network 41, such as a telecommunications, satellite or cable network.

The multifunction I/O controller 24 typically includes a number of functions, such as a floppy disk drive controller for coupling a floppy disk drive 42, a keyboard controller for connecting to a keyboard 44 and a pointing device 46, a serial communications controller for providing at least one serial port 48, and a parallel port interface for providing at least one parallel port 50. In one embodiment of the invention, the keyboard 44 and pointing device 46 are coupled via an infrared transmitter/receiver 52 for wireless communications.

Figure 2:
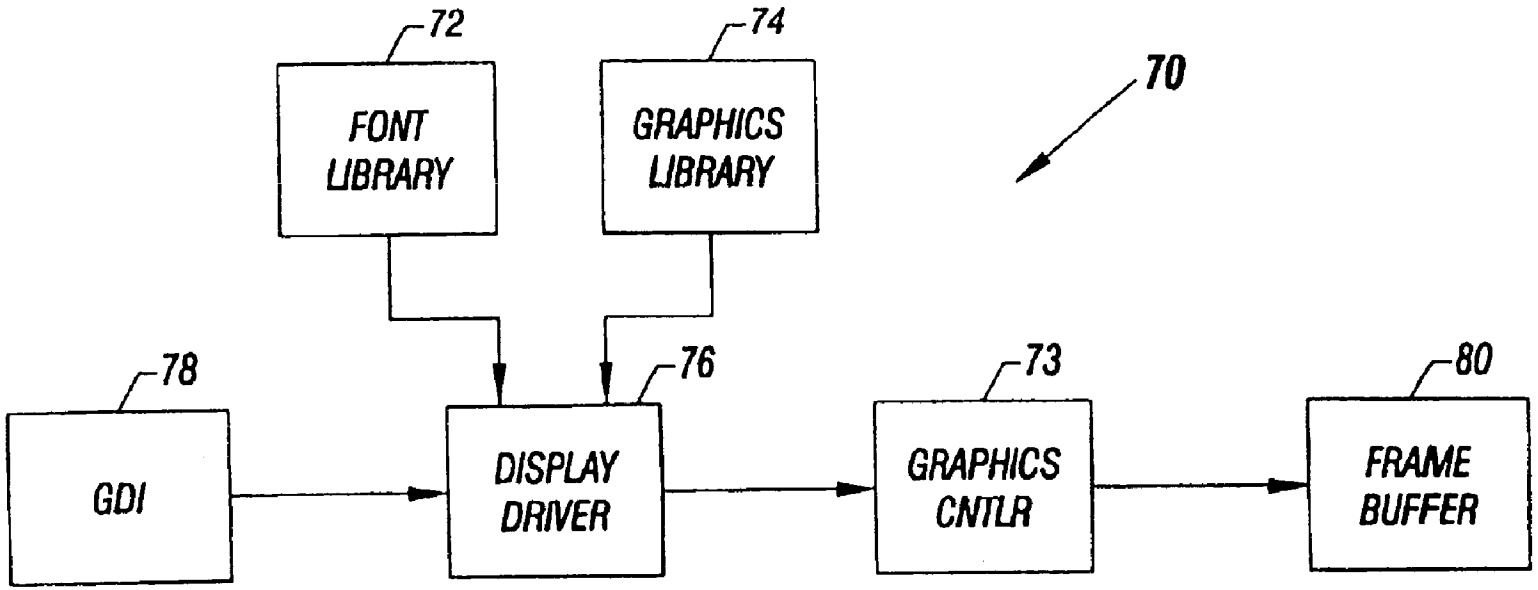
FIG. 2 is a block diagram of a software display driver architecture according to the preferred embodiment.

Referring to FIG. 2, a display driver architecture 70 according to one embodiment of the present invention, may include font library 72 and graphics library 74 for displaying lines and text on the receiver 18. The resulting fonts and graphics are prepared for display on the receiver 18 by the display driver architecture 70.

More specifically, in a display driver architecture 70, in accordance with one embodiment of the invention, a display driver 76 is a dynamic link library ("DLL") that translates device-independent commands from a graphics device interface ("GDI") 78 into commands and actions that the graphics controller 13 may use to draw graphics on the receiver 18. GDI commands may include as examples, bitmap operations, managing graphics objects, managing color palettes, and drawing lines, curves, filled shapes, and text. The device independent commands originate from a software application, such as a drawing program, slide show program, movie program, game program or other application. The display driver 76 may also supply information to the operating system regarding the display hardware (e.g. receiver 18), such as color resolution, graphics capabilities, screen size and resolution, and other display features. The fonts and graphics are rendered into a frame buffer 80.

To take advantage of special features of the graphics controller 13, a display minidriver may be provided in one embodiment of the invention. To take advantage of the font and graphics libraries, the display driver 76 may contain program code to render font and graphics elements according to special alpha blending values embedded with font and graphic elements. The graphics elements may include text, characters, lines, shapes and other graphics primitives. Alpha blending uses pre-defined values, called alpha values, to control the way graphics information is displayed, such as the level of transparency or opacity of graphics primitives. Thus, pixel colors may be blended in varying proportion with the color of the primitive being drawn. The proportion is the transparency or alpha value.

Instead of using the alpha values to create visual effects, the alpha values may be assigned to overcome flickering. That is, by smoothing the edges of horizontal features, the amount of flickering which results may be reduced. Thus, by assigning alpha values which cause background colors to blend with graphics primitives along horizontal lines, the flickering which results from display on analog television receivers may be decreased without the need for computationally complex FIR filtering.

By focusing on the horizontal components which cause filtering, vertical components of graphics primitives need not be affected. Thus, compared to other filtering techniques which are applied indiscriminately to all of the features on the display, the use of alpha blending techniques may be adapted, in some embodiments of the invention, to only adjust the display of horizontal features.

Figure 3:
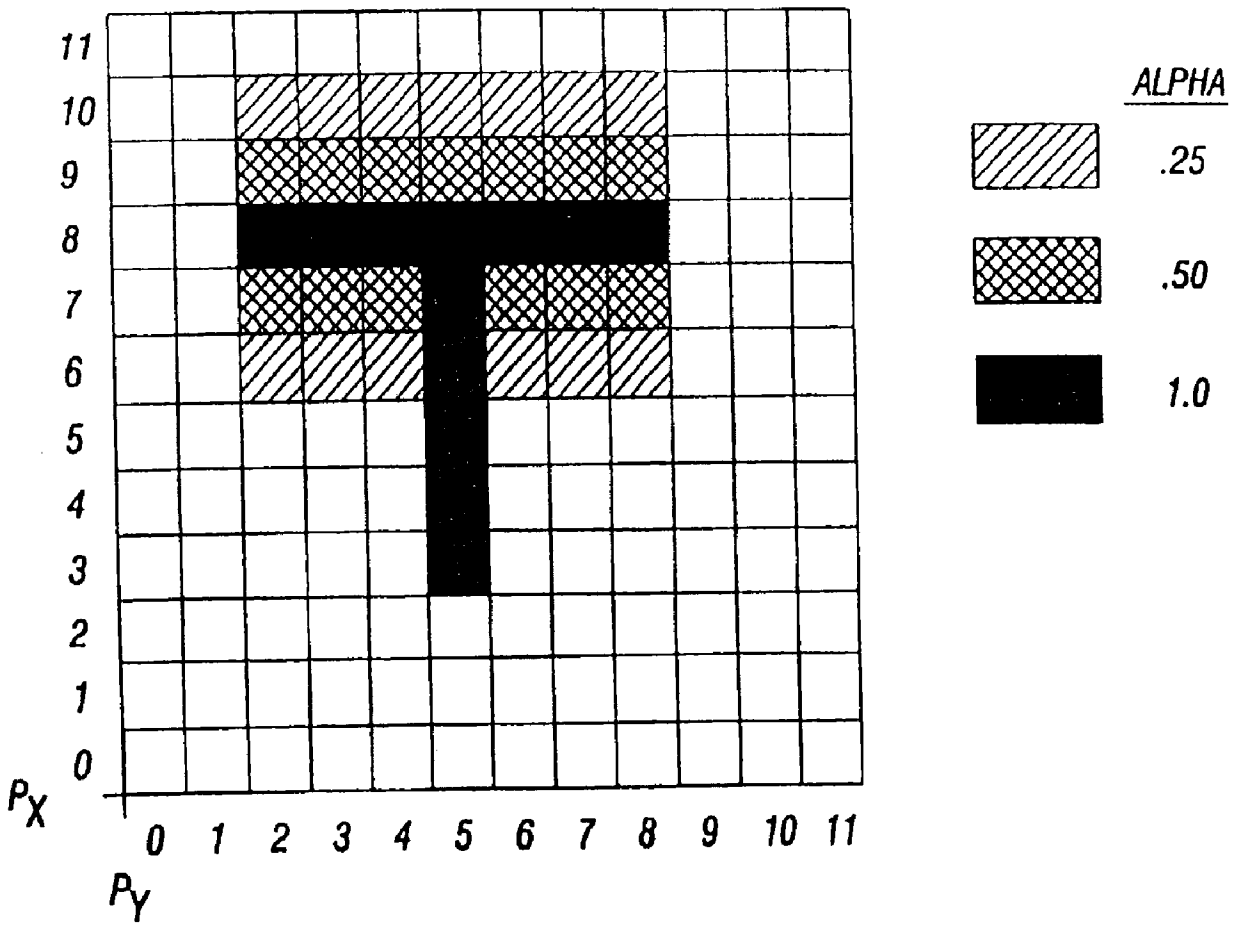
FIG. 3 is a pixel block diagram of a character rendered according to the preferred embodiment.

Referring now to FIG. 3, a letter "T" is prepared according to one embodiment of the present invention. A bitmap may be produced by the display driver 76 according to the font and graphics libraries 72 and 74 and input signals from an application. A normally rendered "T" is shown in solid black in FIG. 3. The enhancements shown around the "T" are the result of an "alpha blending" method according to alpha values embedded with font and graphic primitives.

A font and graphics primitive may have at least one associated alpha value. The alpha value instructs the display driver 76 how to smooth (i.e. how much transparency to implement for) the graphics primitive to reduce flicker. Progressive smoothing may be applied in one or many more stages. For example, the letter "T" may have two alpha values applied in one embodiment of the invention. A first value (0.5) in a first stage is applied to pixels adjacent (once removed) the horizontal sections of the "T" and a second value (0.25) is applied in a second stage to pixels twice removed from the horizontal sections.

The alpha ($\alpha$) blended pixels may take into account the color of the background ($P_{overlay}$) and foreground (font or graphics) ($P_{in}$) to smooth out horizontal primitive edges between the overlay or background and the primitive:

$$P_{out}32\ \alpha*P_{overlay}+(1-\alpha)*\ P_{in}$$

or this may reduce to $$P_{out}=\alpha(P_{overlay}-P_{in})+P_{in}$$

Figure 4:
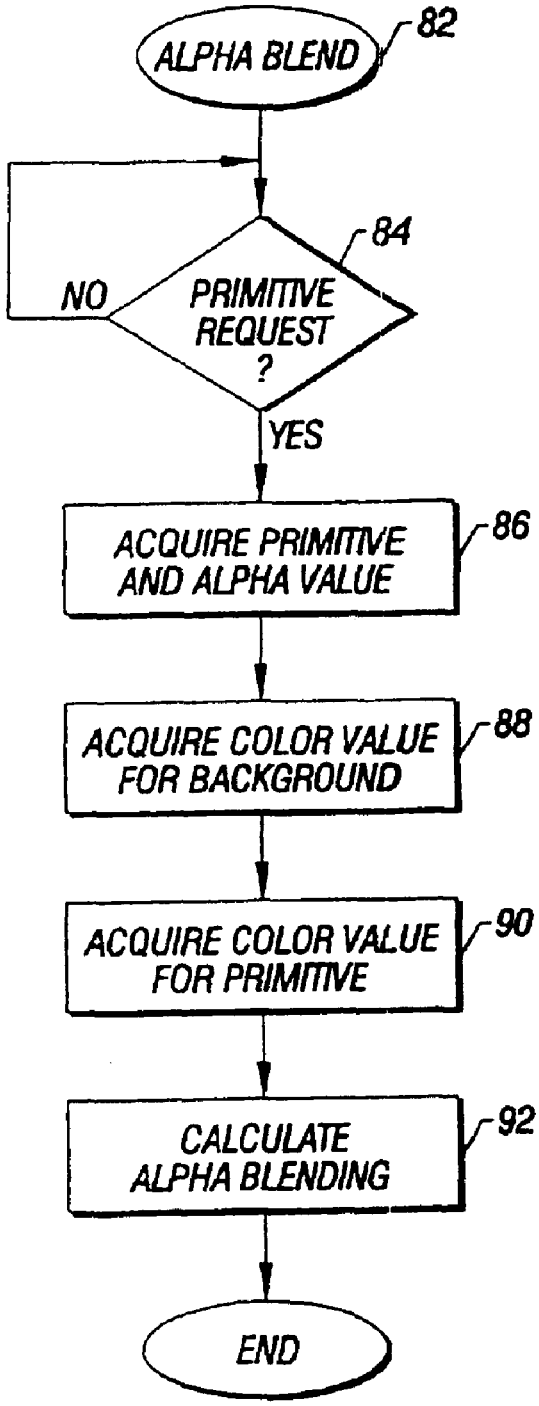
FIG. 4 is a flow chart for software for implementing one embodiment of the present invention.

Referring next to FIG. 4, software 82 for implementing the alpha blending in the graphics controller 13 may be stored on the hard drive 28, in accordance with an embodiment of the present invention. The flow begins by determining whether a primitive has been requested for display as indicated in diamond 84. If so, the primitive may be acquired from the libraries 72 or 74 as the case may be, as indicated in block 86. The color value for the background is then acquired as indicated in block 88. Similarly, the color value for the primitive is acquired as indicated in block 90. The alpha blending equation, set forth above, is then used to calculate a new color value or grey scale value, as indicated in block 92.

The pixels of a video display include three color components such as red, green and blue in an RGB tricolor space. The color values of the three color components are added together to produce a displayed color having a color value.

Using the hypothetical example illustrated in FIG. 3, the color values for pixels $P_{2,9}$ and $P_{2,10}$ can be calculated. Pixel $P_{2,9}$ has a alpha value of 0.5 applied and pixel $P_{2,10}$ has an alpha value of 0.25. These alpha values may be associated with the primitive "T" in the font library. For example, the primitive and its alpha values may be stored together as a file.

Assuming a black letter ($P_{in}$=1 in grey scale) on a white background ($P_{overlay}$=0 in grey scale), $P_{2,9}$=0.5*0+0.5* 1. Broken down into its color components $P_{out}$ yields:

$$P_{RED}=0.5*0h+0.5*FFh=7Fh$$

$$P_{GREEN}=0.5*0h+0.5*FFh=7Fh$$

$P_{BLUE}$=0.5*0h+0.5*FFh=7Fh

Taken together the color components yield a relatively dark grey scale pixel next to the black pixel $P_{2,8}$.

For pixel $P_{2,10}$ the color components are:

$P_{RED}$=0.25*0h+0.75*FFh=BDh $P_{GREEN}$=0.25*0h+0.75*FFh=BDh $P_{BLUE}$=0.25*0h+0.75*FFh=BDh

Taken together the color components yield a lighter grey scale pixel.

Thus, in the example, the black character overlaid on a white background was smoothed with darker gray scale and lighter gray scale blending on the horizontal edges. This blending at horizontal edges reduces the flickering that results from the use the television receiver 18 as a display.

The smoothing can be distributed over a number of pixels outwardly from the horizontal edge by varying the number of alpha blending stages. For example, a value of 0.5 may be used for a single pixel row of smoothing while values of 0.75, 0.5 and 0.25 may be used for three pixel rows of smoothing. Additionally, since the alpha values may be stored as part of font or graphics primitives, individual elements may differ in the number of stages and the alpha values in each stage that are desirable for adequate smoothing. For example, as a hypothetical example, the letter "T" may smooth better with 0.5 and 0.25 alpha values and the letter "R" may smooth best with a single alpha value of 0.4. Graphics primitives, such as horizontal lines may have yet another set of alpha values.

Because the alpha blending may be selectively applied to the horizontal portions of text and graphics in one embodiment of the invention, the flicker filtering of the overall display may be reduced as compared to the use of the prior N-tap flicker filters alone. Moreover, on a pixel to pixel comparison, the use of alpha blending may involve less mathematical processing than the N-tap method. Comparatively, per output pixel color component, a 3-tap filter uses 3 multiplications and 2 additions versus the alpha blending method described above on the "T" which may use one multiplication, one addition and one subtract operation. Therefore, embodiments using alpha blending may provide a more intelligent flicker reduction technique.

In some embodiments alpha blending may be used together with flicker filters, for example using N-tap flicker filters. In some embodiments, less computationally complex FIR filters may be used because of the use of alpha blending. In other embodiments, flicker filters may be eliminated.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

acquiring a graphics primitive to be displayed on a television receiver; and selectively adjusting the transparency of portions of the primitive relative to a background to reduce flicker when the primitive is displayed on a television receiver by smoothing the horizontal edges of the primitive based on the color of the primitive and the color of the background.

2. The method of claim 1 including acquiring the primitive from a library.

3. The method of claim 1 including forming a bit map of the primitive for overlaying on said background.

4. The method of claim 1 wherein selectively adjusting involves adjusting only a horizontal portion of said primitive.

5. The method of claim 4 further including selecting at least two alpha values for a horizontal portion of said primitive and adjusting the depiction of said primitive in two stages.

6. The method of claim 5, wherein selectively adjusting includes modifying at least one row of pixels adjacent horizontal portions of the element.

7. The method of claim 1 wherein selectively adjusting includes using alpha blending.

8. The method of claim 7, wherein selectively adjusting includes subtracting the color value of the primitive from the color value of the background color and multiplying the difference by an alpha value.

9. An article comprising a medium for storing instructions that enable a processor-based system to:

acquire a graphics primitive to be displayed on a television receiver; and selectively adjust the transparency of the primitive relative to a background to reduce flicker when said primitive is displayed on a television receiver by smoothing the horizontal edges of the primitive based on the color of the primitive and the color of the background.

10. The article of claim 9 further storing instructions that cause a processor-based system to multiply an alpha value times the difference of a color value for the background color and the color value for the graphical primitive and to add the color value of the primitive.

11. The article of claim 10 further storing instructions that cause a processor-based system to acquire a font and an alpha value from a database.

12. The article of claim 9 further storing instructions that cause a processor-based system to alpha blend the horizontal edges of a graphical primitive.

13. The article of claim 12 further storing instructions that cause a processor-based system to alpha blend the edges of a graphical primitive in at least two stages.

14. An apparatus to reduce flicker comprising:

a processor; and a storage coupled to said processor, said storage storing instructions to enable a graphics primitive to be acquired for display on a television receiver and to selectively adjust the transparency of the primitive relative to the background to reduce flicker by smoothing the horizontal edges of the primitive based on the color of the primitive and the color of the background.

15. The apparatus of claim 14 including a tuner card coupled to said processor.

16. The apparatus of claim 15 including a television receiver coupled to said processor.

17. The apparatus of claim 16 wherein said storage includes a font database associated with alpha values that reduce flicker.

18. The apparatus of claim 17 wherein said storage includes instructions to cause an alpha value to be multiplied by the difference of the color values of a background and primitive and to add the color value of the primitive.

*19. A method comprising:*

*acquiring a graphics primitive to be displayed; and*

*selectively adjusting the transparency of portions of the primitive relative to a background to reduce flicker when the primitive is displayed by smoothing horizontal edges of the primitive based on the color of the element and the color of the background.*

*20. The method of claim 19 including acquiring the primitive from a library.*

*21. The method of claim 19 including forming a bit map of the primitive for overlaying on said background.*

*22. The method of claim 19 wherein selectively adjusting involves adjusting only a horizontal portion of said primitive.*

*23. The method of claim 22 further including selecting at least two alpha values for a horizontal portion of said primitive and adjusting the depiction of said primitive in two stages.*

*24. The method of claim 23, wherein selectively adjusting includes modifying at least on row of pixels adjacent horizontal portions of the element.*

*25. The method of claim 19 wherein selectively adjusting includes using alpha blending.*

*26. The method of claim 25, wherein selectively adjusting includes subtracting the color value of the primitive from the color value of the background color and multiplying the difference by an alpha value.*

*27. An article comprising a medium for storing instructions that cause a processor-based system to:*

*acquire a graphics primitive to be displayed; and*

*selectively adjust the transparency of the primitive relative to background to reduce flicker when said primitive is displayed by smoothing horizontal edges of the primitive based on the color of the element and the color of the background.*

*28. The article of claim 27 further storing instructions that cause a processor-based system to multiply an alpha value times the difference of a color value for the background color and the color value for the graphical primitive and to add to the color value of the primitive.*

*29. The article of claim 28 further storing instructions that cause a processor-based system to acquire a font and an alpha value from a database.*

*30. The article of claim 27 further storing instructions that cause a processor-based system to acquire a font and an alpha value from a database.*

*31. The article of claim 27 further storing instructions that cause a processor-based system to alpha blend the edges of a graphical primitive in at least two stages.*

*32. An apparatus to reduce flicker compromising:*

*a processor;*

*a storage coupled to said processor, said storage storing instructions to cause a graphics primitive to be acquired for display and to selectively adjust the transparency of the primitive relative to a background to reduce flicker by smoothing horizontal edges of the primitive based on the color of the element and the color of the background.*

*33. The apparatus of claim 32 including a tuner card coupled to said processor.*

*34. The apparatus of claim 33 including a television receiver coupled to said tuner card.*

*35. The apparatus of claim 34 wherein said storage includes a font database associated with alpha values that reduce flicker.*

*36. The apparatus of claim 35 wherein said storage includes instructions to cause an alpha value to be multiplied by the difference of the color values of a background and primitive and to add to the color value of the primitive.*

* * * * *

UNITED STATES PATENT AND TRADEMARK OFFICE

CERTIFICATE OF CORRECTION

PATENT NO. : RE 39,214 E
APPLICATION NO. : 10/742694
DATED : August 1, 2006
INVENTOR(S) : Gryskiewicz It is certified that error appears in the above-identified patent and that said Letters Patent is hereby corrected as shown below:

In column 4, at line 32, delete “32” and insert --=--.

Signed and Sealed this

Twenty-seventh Day of November, 2007

JON W. DUDAS
*Director of the United States Patent and Trademark Office*